US012689318B2

(12) United States Patent　(10) Patent No.: US 12,689,318 B2
Rasch et al.　(45) Date of Patent: Jul. 21, 2026

(54) POWER ELECTRONIC CIRCUIT

(71) Applicant: ZF Friedrichshafen AG, Friedrichshafen (DE)

(72) Inventors: Marc Rasch, Immenstaad (DE); Sebastian Besold, Neudrossenfeld (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 167 days.

(21) Appl. No.: 18/606,840

(22) Filed: Mar. 15, 2024

(65) Prior Publication Data

US 2024/0322732 A1　Sep. 26, 2024

(30) Foreign Application Priority Data

Mar. 21, 2023 (DE) ..................... 10 2023 202 465.9

(51) Int. Cl.
*H02P 29/024* (2016.01)
(52) U.S. Cl.
CPC .................................. *H02P 29/024* (2013.01)
(58) Field of Classification Search
CPC ....... H02P 29/024; H02M 1/088; H02M 1/32; H02M 3/158; H02M 7/217; H02M 7/537
USPC .................................................. 318/445, 558
See application file for complete search history.

(56) References Cited

U.S. PATENT DOCUMENTS

| | | | | |
|---|---|---|---|---|
| 7,395,888 B2 * | 7/2008 | Yamamoto | ............ | B60W 10/08 |
| | | | | 903/907 |
| 10,161,989 B2 * | 12/2018 | Tavernier | ............... | H03K 17/18 |
| 10,924,001 B2 * | 2/2021 | Li | ........................ | H02M 5/4585 |
| 11,038,457 B2 * | 6/2021 | Pokkinen | ............. | H02H 7/1227 |
| 2017/0192049 A1 | 7/2017 | Tavernier et al. | | |

FOREIGN PATENT DOCUMENTS

| | | | |
|---|---|---|---|
| DE | 10 2015 206 531 A1 | 1/2016 | |
| DE | 10 2022 102 114 A1 | 8/2022 | |

OTHER PUBLICATIONS

Office Action dated Dec. 4, 2023 for German Patent Application No. 10 2023 202 465.9 (11 pp.), note: pp. 1 and 2 are English language Explanations to Section C. Result of Determination Document.

* cited by examiner

*Primary Examiner* — David Luo
(74) *Attorney, Agent, or Firm* — Crowell & Moring LLP

(57) ABSTRACT

A power electronic circuit includes a topological switch having at least two power semiconductors connected in parallel, a driver configured to drive the power semiconductors, a gate resistor between the driver and the power semiconductors, a monitoring device to detect a voltage drop between two load terminals of the topological switch and output it as a signal, and a comparison device arranged between the driver and the gate resistor and configured to compare the signal output from the monitoring device with a current signal output from the driver, wherein, in the event that the detected difference exceeds a predetermined threshold value and a signal is additionally output by the driver instructing that the power semiconductors should not be conductive, the monitoring device outputs an emergency signal to the driver, which is configured to then output a signal to the power semiconductors to put them into a safety state.

14 Claims, 2 Drawing Sheets

100

POWER ELECTRONIC CIRCUIT

CROSS-REFERENCE TO RELATED APPLICATION

This application claims priority to German Application No. DE 10 2023 202 465.9, filed on Mar. 21, 2023, the entirety of which is hereby fully incorporated by reference herein.

FIELD

The present disclosure relates to the field of electromobility, in particular of power electronic modules for an electric drive.

BACKGROUND

The use of electronic modules, such as power electronic modules, in motor vehicles has increased significantly in recent decades. On the one hand, this is due to the need to improve fuel economy and vehicle performance, and, on the other hand, to advances in semiconductor technology. Semiconductor chips are used in power electronics. These are parallelized to form a topological switch if the current-carrying capacity is to be increased. Semiconductor chips, which are connected in parallel and are usually made of silicon or silicon carbide, can be installed in individual, pre-packaged components, so-called discrete components, or together in a circuit carrier, the so-called power electronic module or power module. A high packing density must be ensured in the power modules so that unwanted effects such as oscillations or overvoltages can be avoided. This means that even high potential differences can be located very close to each other, which has advantages in terms of electrical behavior. In addition, the parallelized chips are also packed close together locally, e.g., to reduce the difference in dynamic current distribution.

In the event of a malfunction of a single semiconductor chip in a network of several parallelized semiconductor chips (topological switch), e.g., no possibility of bringing the individual semiconductor chip of a topological switch from a conductive state back into a blocking state, a safe state of the topological switch may no longer be achieved. Detection and a temporally rapid reaction cannot take place within a very short time without great effort, e.g., before a thermal event or other uncontrolled events occur.

SUMMARY

Therefore, the present disclosure addresses the problem of providing a corresponding circuit with a monitoring system in order to detect a fault in the region of the power semiconductors and to implement a countermeasure.

This problem is solved by the features disclosed herein. Advantageous embodiments are also disclosed herein.

A power electronic circuit is proposed, comprising a topological switch composed of at least two power semiconductors connected in parallel with each other, and a driver configured to drive the power semiconductors, and a gate resistor arranged between the driver and the power semiconductors, and a monitoring device formed and arranged to detect a voltage drop between two load terminals of the topological switch and output it as a signal, and a comparison device arranged between the driver and the gate resistor and configured to compare the signal output from the monitoring device with a current signal output from the driver, wherein, in the event that the detected difference exceeds a predetermined threshold value, and a signal is additionally output by the driver instructing that the power semiconductors should not be conductive, the monitoring device outputs an emergency signal to the driver, which is configured to then output a signal to the power semiconductors in order to put them into a safety state.

In one embodiment, it is provided that the power semiconductors are formed as a transistor comprising at least one MOSFET or one IGBT.

In one embodiment, it is provided that the safety state is a state in which all power semiconductors are in a conductive state or an active short circuit is generated.

In one embodiment, it is provided that a faulty state is a defective power semiconductor and/or a defect in the intermediate circuit.

In one embodiment, it is provided that the power electronic circuit is part of an electronic module of a motor vehicle.

Furthermore, an electronic module is provided for actuating the electric drive and comprises the power electronic circuit. Furthermore, an inverter is provided, comprising the power electronic circuit. Furthermore, an electric drive for a motor vehicle, in particular an electric axle drive, is provided, having at least one electric machine, a transmission and the inverter. Furthermore, a motor vehicle with the electric drive is provided.

Furthermore, a method for monitoring the power electronic circuit is provided, wherein, in the event that a gate leakage current generated by a faulty power semiconductor between two power terminals of the topological switch is detected and a signal is additionally output by the driver instructing that the power semiconductors should not be conductive, all power semiconductors of the topological switch are put into a safety state.

Further features and advantages of the present disclosure will become apparent from the following description of exemplary embodiments of the present disclosure, with reference to the figures in the drawing, which shows details according to the present disclosure, and from the claims. The individual features can be realized individually or in any combination in a variant of the present disclosure.

Preferred embodiments of the present disclosure are explained in greater detail below with reference to the accompanying drawings.

DETAILED DESCRIPTION

In the following figure descriptions, like elements or functions are provided with like reference signs.

The present disclosure relates to a power electronic circuit for use in the automotive sector, in particular in power electronic modules of an inverter of at least partially electrically powered vehicles.

Figure 1:
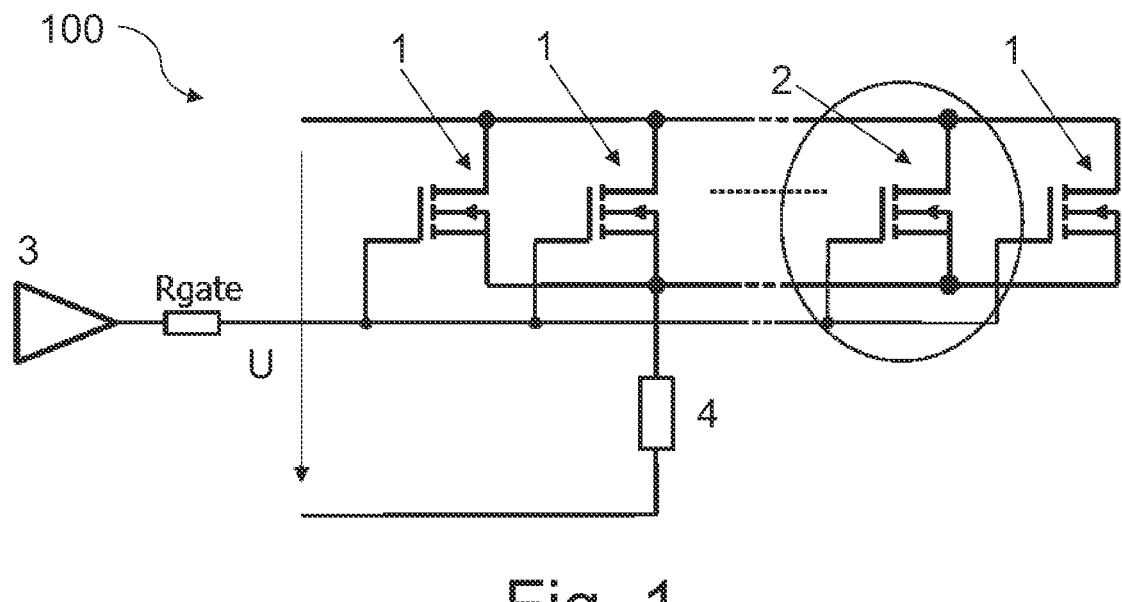
FIG. 1 shows a basic structure of a power electronic circuit with a defective power semiconductor according to the prior art.

The power electronic circuit has at least one topological switch, which is formed from at least two power semiconductors 1, 2 connected in parallel with one another. These are advantageously formed as a MOSFET (as shown in the figures) or an IGBT, wherein other transistors suitable for the intended application can also be used. In addition, the power electronic circuit has a driver 3, which is configured to actuate the power semiconductors 1, 2, as well as an associated gate resistor R_gate connected in series, as shown in FIG. 1. A load 4 is also shown in order to energize the power semiconductors 1, 2. The HV voltage U is also shown. This structure is a standard structure according to the prior art and is shown in FIG. 1.

Figure 2:
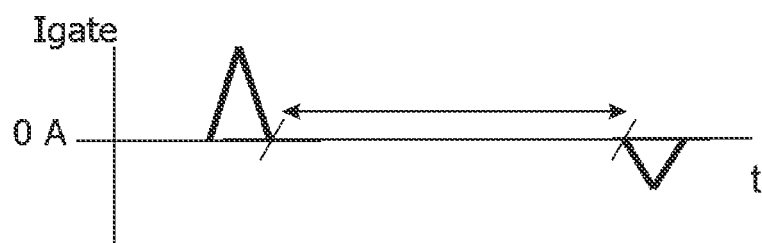
FIG. 2 shows a current-time graph of a current curve for a topological switch without defective power semiconductors.

FIG. 2 shows a current curve (I_gate over time t) when there is no fault in the topological switch. A clear current peak can be seen both when switching on and when switching off. In FIG. 2, this is shown on the left for switching on and on the right for switching off. In between is the conduction phase of the topological switch.

Figure 3:
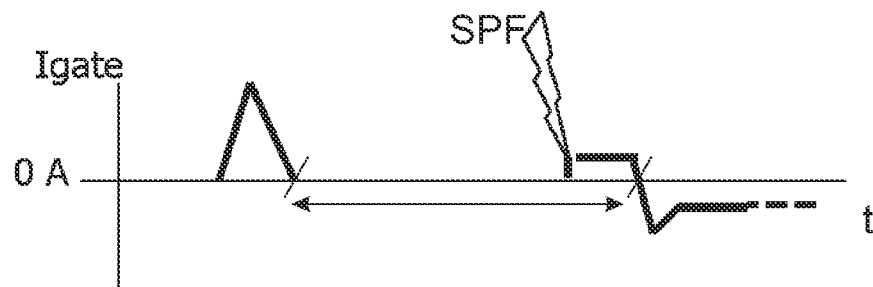
FIG. 3 shows a current-time graph of a current curve for a topological switch with a defective power semiconductor.

If a fault event SPF occurs in the topological switch during the conduction phase (also referred to as a single point failure SPF), the current curve behaves as shown in FIG. 3. A failure event usually causes a gate structure of one of the parallel power semiconductors 1, 2 to leak, wherein in this case the defective power semiconductor is denoted by reference sign 2. This gate leak continuously draws current from the driver 3, which can be clearly seen on the right-hand side in FIG. 3 after the fault event SPF has occurred.

Figure 4:
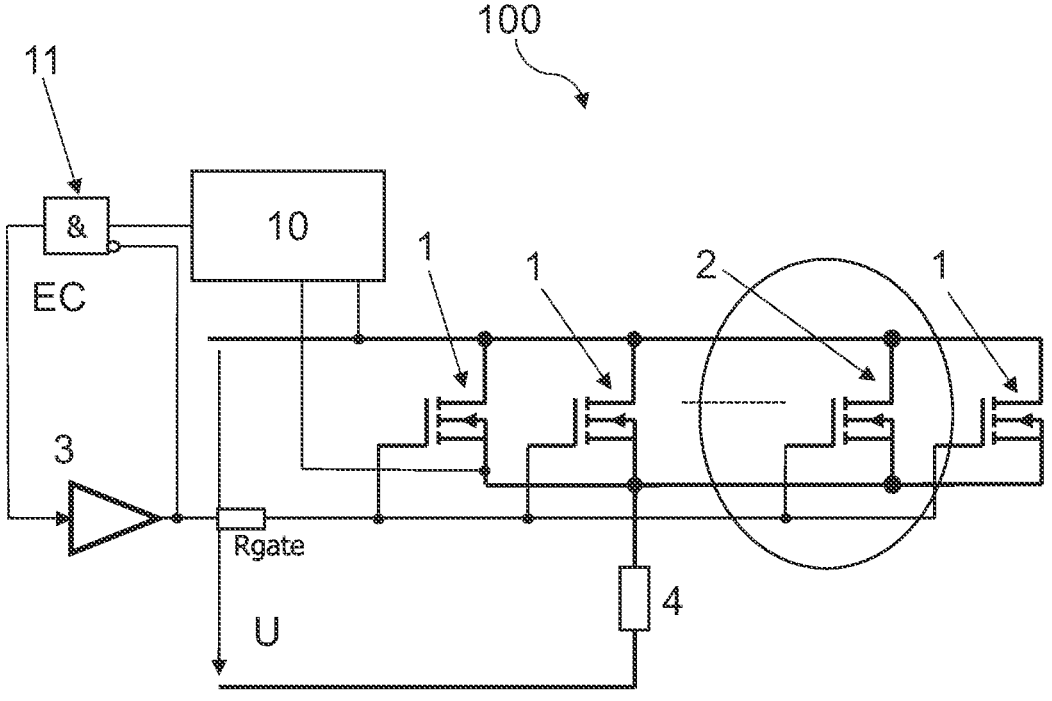
FIG. 4 shows a basic structure of a power electronic circuit according to one embodiment of the present disclosure.

According to the present disclosure, this effect is utilized as described below, as shown in FIG. 4. In the event of a defective power semiconductor 2, a voltage drop will occur across the topological switch between the power terminals of the power semiconductors 1, 2 (drain/source in the case of a MOSFET and emitter/collector in the case of an IGBT). This voltage drop is compared with the current signal of the driver 3 by a comparison device 11 (e.g., a comparator). If the voltage drop rises above a threshold value that can be set by a person skilled in the art via the monitoring device 10 between the drain and source, for example, and the driver 3 simultaneously outputs a "do not conduct" signal, the driver 3 is switched to emergency signal EC. This means that the monitoring device 10 is formed in such a way that it outputs an emergency signal EC to the driver 3 if a voltage drop is detected. This can be done via a bypass. The driver 3 responds by executing a safety reaction and transferring the topological switch to a safe state. This is advantageously a switching on of all power semiconductors 1, 2 of the topological switch or, in the case of a B6 bridge, switching to an active short circuit.

In this case, a "standard" desat signal would not intervene at the switch concerned, as it would first have to wait for the desat signal from the complementary switch, which would be triggered by the subsequent bridge short circuit. Thus, the subject matter of the present disclosure can be considered to be an inverted desat protection which is executed faster than the standard desat protection.

The voltage is monitored using a suitable component, e.g., a Schmitt trigger. In one embodiment, a timing element (e.g., RC element) is also provided, which only outputs the emergency signal EC to the driver 3 after a preset time. This serves to recognize only an actual fault as a fault and not to trigger an unnecessary safety reaction. A safety reaction is an action that brings the system (in particular the affected topological switch and thus the inverter) into a safe state (safety state). This can be that all power semiconductors 1,

2 of the topological switch in which the fault was detected are switched to a conductive state, or that an active short circuit is generated.

The main application of the monitoring device 10 is to detect a defective power semiconductor 2 due to an unexpected voltage between the drain and source. However, the DC link voltage (DC voltage) can also be measured and monitored. The power semiconductor is connected in series with another power semiconductor in parallel with the DC link voltage. This means that the voltage states are clear in the fault-free case. If the voltage states change unexpectedly, this also indicates a possible fault condition It is also possible to optimize the switching speed depending on the measured DC voltage, as a higher di/dt can be achieved with a lower DC voltage. With a lower DC link voltage and/or a lower load current, there is still sufficient distance during the switch-off torque of the characteristic switch-off overvoltage to the maximum voltage value of the power semiconductor. Thus, with an intelligent driver, the di/dt could be increased in order to produce fewer switching losses where possible.

By detecting a gate leakage current at the relevant leakage point between the driver and semiconductor, a fault event SPF can be detected directly at the topological switch and a reaction initiated even before the complementary desat protection detects the fault. This gains time to transfer the system to a safe state, which in the case of a vehicle can be a coasting down, for example. The reaction time of the system (driver 3) to a fault can also be set individually using a timing element. Furthermore, the circuit complexity is relatively low, making implementation cost-effective.

Due to the possibility of reacting quickly to a fault event SPF and setting all power semiconductors 1, 2 to a conductive state, a thermal event, a torque event and/or a high-voltage event can potentially be avoided.

By providing the monitoring device 10 at each topological switch of the system, it is additionally directly known at which topological switch the fault event SPF has occurred and a corresponding reaction can take place in the correct switch (highside/lowside), as no processing in a control unit (microcontroller) is necessary.

The proposed circuit arrangement is preferably used in a power electronic device of an inverter. The power electronic device is in this case part of an electronic module (power electronic module). An electronic module within the scope of the present disclosure is used to operate an electric drive of a vehicle, in particular an electric vehicle and/or a hybrid vehicle, and/or electrified axles. The electronic module comprises a DC/AC inverter. It may also comprise an AC/DC rectifier, a DC/DC converter, a transformer and/or another electrical converter or part of such a converter or may be a part thereof. In particular, the electronic module is used to power an electric machine, for example an electric motor and/or a generator. A DC/AC inverter is preferably used to generate a multi-phase alternating current from a direct current generated by a DC voltage from an energy source, such as a battery.

Inverters for electric drives in vehicles, in particular passenger cars and commercial vehicles, as well as buses, are designed for the high-voltage range and are particularly designed for a reverse voltage class of approximately 650 volts and above.

LIST OF REFERENCE SIGNS

1 power semiconductor (transistor)
2 defective power semiconductor (transistor)

3 driver
4 load
10 monitoring device
11 comparison device
100 topological switch
R_gate gate resistor
U voltage
EC emergency signal
SPF fault event

The invention claimed is:

1. A power electronic circuit comprising:
   a topological switch comprising at least two power semi-conductors connected in parallel with each other;
   a driver configured to actuate the power semiconductors;
   a gate resistor arranged between the driver and the power semiconductors;
   a monitoring device configured to detect a voltage drop between two load terminals of the topological switch and output it as a signal; and
   a comparison device arranged between the driver and the gate resistor and configured to compare the signal output by the monitoring device with a current signal output by the driver,
   wherein, the monitoring device is configured to output an emergency signal to the driver in response to a detected difference detected by the comparison device exceeding a predetermined threshold value and a signal being additionally output by the driver instructing that the power semiconductors should not be conductive,
   wherein the driver is configured to responsively output a signal to the power semiconductors to put them into a safety state.

2. The power electronic circuit as claimed in claim 1, wherein the power semiconductors are formed as transistors comprising at least one MOSFET or one IGBT.

3. The power electronic circuit as claimed in claim 1, wherein the safety state is a state in which the power semiconductors are in a conductive state or in which an active short circuit is generated.

4. The power electronic circuit as claimed in claim 1, wherein a faulty condition is a defective power semicon-ductor and/or a defect in an intermediate circuit.

5. The power electronic circuit as claimed in claim 1, which is part of an electronic module of a motor vehicle.

6. An electronic module for actuating an electric drive, the electronic module comprising:
   the power electronic circuit as claimed in claim 1.

7. An inverter comprising:
   the power electronic circuit as claimed in claim 1.

8. An electric axle drive for a motor vehicle comprising:
   one or more electric machine;
   a transmission; and
   the inverter as claimed in claim 7.

9. A motor vehicle comprising:
   the electric axle drive as claimed in claim 8.

10. A method for monitoring a power electronic circuit, wherein the power electronic circuit comprises:
    a topological switch comprising at least two power semiconductors connected in parallel with each other;
    a driver configured to actuate the power semiconduc-tors;
    a gate resistor arranged between the driver and the power semiconductors;
    a monitoring device configured to detect a voltage drop between two load terminals of the topological switch and output it as a signal; and
    a comparison device arranged between the driver and the gate resistor and configured to compare the signal output by the monitoring device with a current signal output by the driver,
    wherein the method comprises:
    placing the at least two power semiconductors of the topological switch into a safety state in response to detecting a gate leakage current generated by a faulty power semiconductor between two power terminals of the topological switch and the driver outputting a signal instructing that the power semiconductors should not be conductive.

11. The method as claimed in claim 10, wherein the power semiconductors are formed as transistors comprising at least one MOSFET or one IGBT.

12. The method as claimed in claim 10, wherein placing the at least two power semiconductors of the topological switch into a safety state comprises:
    placing the power semiconductors in a conductive state.

13. The method as claimed in claim 10, wherein placing the at least two power semiconductors of the topological switch into a safety state comprises:
    placing the power semiconductors in a state in which an active short circuit is generated.

14. The method as claimed in claim 10, wherein faulty power semiconductor comprises a defective power semicon-ductor and/or a defect in an intermediate circuit.

* * * * *